Nov. 4, 1924.   1,514,261
J. REICHERT
ANTISKID DEVICE
Filed Oct. 13 1920   2 Sheets-Sheet 2
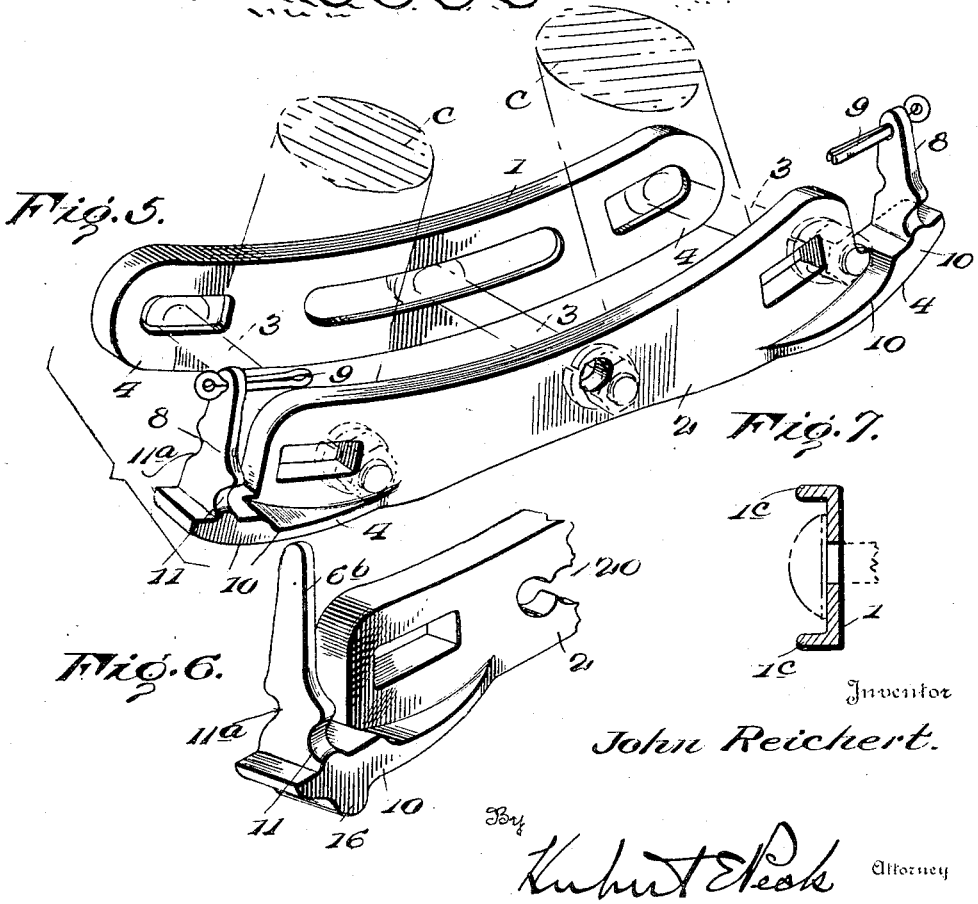
Inventor
John Reichert.

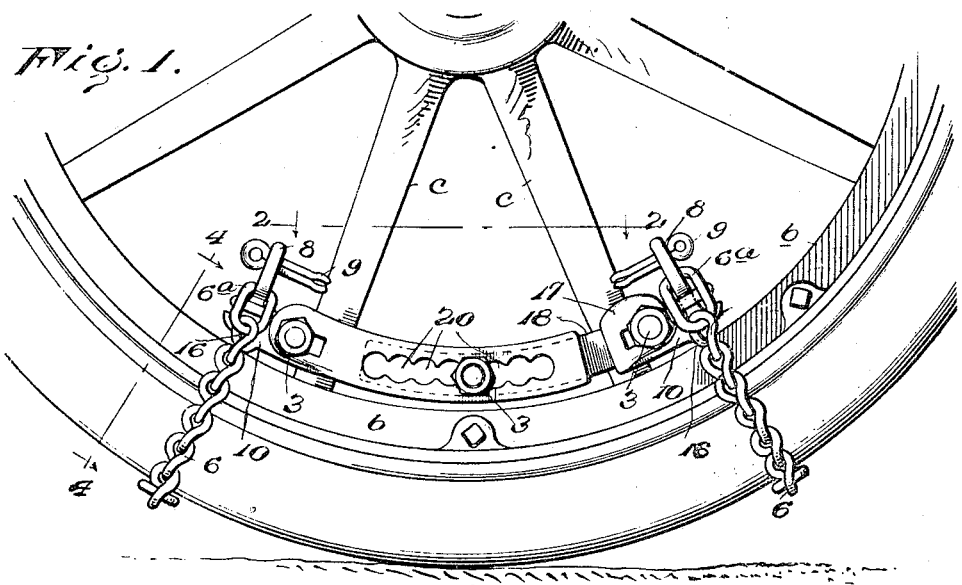
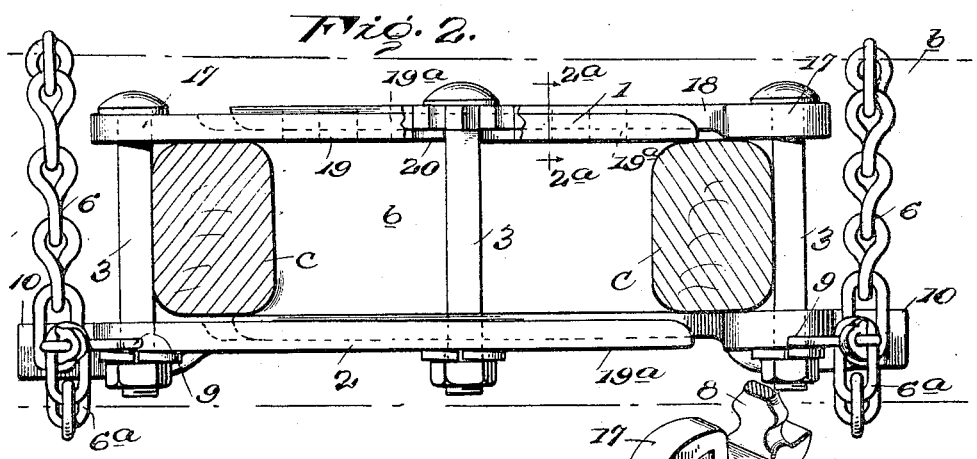
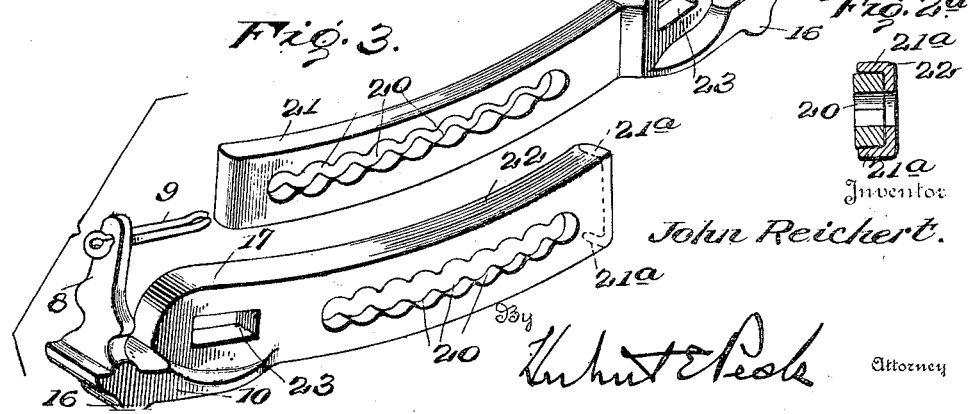

Patented Nov. 4, 1924.

1,514,261

UNITED STATES PATENT OFFICE.

JOHN REICHERT, OF RACINE, WISCONSIN.

ANTISKID DEVICE.

Application filed October 13, 1920. Serial No. 416,602.

*To all whom it may concern:*

Be it known that I, JOHN REICHERT, a citizen of the United States of America, and resident of Racine, Racine County, State of Wisconsin, have invented certain new and useful Improvements in and Relating to Antiskid Devices, of which the following is a specification.

This invention relates to improvements in and relating to anti-skid devices for vehicle wheels; and the objects and nature of the invention will be readily understood by those skilled in the art in the light of the following explanations of the accompanying drawings illustrating what I now believe to be the preferred mechanical expressions or embodiments of the invention from among other forms, constructions and arrangements within the spirit and scope thereof.

An object of the invention is to provide certain improvements in truck chains (meaning broadly vehicle wheel anti-skid devices) whereby an improved and highly advantageous structure will be provided for the attachment of both ends of each chain to one bar or plate adapted to be clamped against lateral faces of the vehicle wheel.

With this and other objects in view, my invention consists in certain novel features in construction, combinations and arrangements as more fully and particularly described and set forth hereinafter.

Referring to the accompanying drawings:—

Fig. 1 is an outer side elevation of a part of a vehicle wheel having a truck chain of my invention applied thereto.

Fig. 2 is a section on the line 2—2, Fig. 1, one of the clamping bars being partially broken away.

Fig. 2$^a$ is a detail section on line 2$^a$—2$^a$, Fig. 2.

Fig. 3 is a detail perspective view of the clamping bar of Fig. 1, the members of said bar being shown separated and spaced apart.

Fig. 4 is a cross section on the line 4—4, Fig. 1.

Fig. 5 is a perspective view of a pair of clamping bars of a modified construction, bolts and spokes being indicated by dotted lines.

Fig. 6 is a detail perspective of a portion of a clamping bar showing a chain link receiving finger without the cotter pin.

Fig. 7, is a detail cross section through the clamping bar of Fig. 5, that is adapted to be located at the inner side of the wheel.

In the simple embodiment of my invention (Fig. 5), two one-piece longitudinally elongated bars or plates 1, 2 are clamped by several cross-bolts 3, against opposite-side lateral faces of the vehicle wheel. The plate or bar 1 is arranged at the inner side of the wheel and fits the inner lateral or side faces of several spokes $c$ and the bar 2 is arranged opposite the bar 1, at the outer side of the wheel and fits the outer side faces of said spokes. In this particular example, each bar has a central opening to receive a center cross bolt 3, and longitudinally elongated end slots to receive end cross bolts, and permit positioning of the bolts longitudinally of the bars as may be required by the spoke arrangement of any particular wheel. In this form, the bars traverse two adjacent spokes and project in opposite directions beyond said spokes and three clamping bolts are employed with the center bolt extending through the space between said two spokes while the opposite ends of the bars are clamped and braced by the end bolts arranged in the spaces between said spokes and the adjacent spokes, respectively. In this example, the end portions of the outer edge of the elongated bar 2, are shaped to form pillows or shoes 4, to seat on and provide a solid or firm bearing against the inner surface of the wheel felloe $b$.

The inner-side bar 1 is designed to merely provide an anchorage for the cross bolts to enable said bolts to rigidly clamp and maintain the outer-side bar in position on the wheel, as the traction elements are directly coupled to the outer-side bar which sustains the pull thereof when the vehicle wheel is rotating. The inner-side bar 1 hence can be lighter and cheaper in construction, than the outer-side bar to which traction elements are secured.

In this example, two traction elements are carried by the pair of bars 1 and 2, and each element consists of a length of suitable traction or anti-skid chain 6, at both ends having flat strong links 6$^a$, i. e., each end of the chain is equipped with an approximately elongated link 6$^a$ by which the chain end is attached to the bar 2.

For the purpose of cooperating with said end links in attaching the chains, the outer side bar 2 is formed with longitudinally extended opposite ends 10, having perpendicular fingers 8 extending inwardly from the inner edges or faces of the ends, with respect to the axis of the wheel. It will be thus noted that the bar 2 is equipped with two fingers 8 integral therewith and extending inwardly (approximately toward the wheel axis) from its inner faces or edges, and that each finger is approximately straight and so formed or arranged that both end links 6ª of a traction element (a chain 6) can be dropped over said finger so that one finger will secure both ends of a chain to the bar 2.

If so desired, each finger can be formed in its free end portion with a transverse perforation to removably receive a cotter pin 9 to confine the chain links 6ª on the finger against accidental detachment or dropping therefrom as the wheel revolves.

If so desired, the fingers can be extended in length, see finger 6ᵇ, Fig. 6, to avoid the use of the cotter pin 9, and yet permit sufficient slack in the chain without danger of the links 6ª slipping and dropping from the fingers as the wheel revolves.

In other words, I do not wish to limit my invention to the cotter pins or other like stop means on the fingers.

The ends of the chain extend in opposite directions from the finger on which the end links 6ª of the chain are engaged, and these links rest one on the other while the outer link with respect to the wheel axis rests on the inner edge or surface of the bar end 10. If so desired, each finger can be formed with a socket or notch 11 in one edge near or at the base of the finger to receive the end of the (outermost) chain link, and a relatively elevated socket or notch 11ª in the opposite edge to receive the end of the other chain link. After the bars 1, 2, have been clamped on a wheel, the chains, traction elements, can be applied thereto or removed therefrom, as road conditions require.

One end link of a chain is placed on a finger, and the chain is then passed around the wheel tire and over the rim or felloe and its other end link is then slipped over and down on the same finger. If a cotter pin is to be employed, it can then be passed through the free end of the finger to prevent the chain links dropping from the finger even though the chain should break or wear through at its road-engaging portion. However, I usually prefer to employ fingers of such form or length that the link will remain thereon without the use of cotter pins or the like, and thus permit the links to drop from the fingers should a chain break or wear through. This will prevent the flying ends of a broken chain from becoming entangled in or damaging the brake or other parts on or adjacent to the inner side of the wheel.

It will be noted that the chain under traction pulls in opposite directions on the finger receiving its end links, and that the lateral strain on the finger is hence approximately neutralized; and also that the bar ends 10 which are reduced in thickness, form the shoes or pillows of the bar that are seated on the wheel felly and that the fingers extend inwardly from these ends so that the outer end or base of each finger is in effect seated directly against the felly; also the end portions of the bar 2 are rigidly held and braced by the end cross bolts which pass therethrough.

The edge notches in the fingers aid in holding the chain links in their proper positions on the fingers, and also aid in preventing the links working or creeping toward the free end of the finger, particularly where the cotter pins or other stops on the free ends of the fingers are not employed.

The notches can be arranged so that the chain end from the inner side of the wheel and extending across the inner face of the rim or felloe, will have its link resting in the notch 11 at the base of the finger on which the superimposed fingers are located, or the notches can be arranged so that the relative positions of the superimposed links (Fig. 4) can be reversed. This result can be accomplished by reversing the bar 2 so that either side face thereof can rest against the spokes to attain the notch, and consequent link arrangement desired.

Instead of forming the bar 1, in one piece, and the bar 2, in one piece, these bars can be formed of longitudinal sections, whereby the effective lengths thereof can be increased or diminished accordingly to the spoke arrangement or dimensions of various wheels.

In this adjustable embodiment of my invention, I show the inner and outer side bars curved in form (although I do not wish to so limit my invention). The inner side bar, in this instance, is not formed with distinct outer-edge shoes or pillows, while the outer side bar is provided with rounded semi-cylindrical end pilows or shoes 16 at its outer edge directly opposite or radially alined with the end fingers that receive the traction chain loops, so that said pillows firmly seat against the felly, sustain and back the bar ends carrying the fingers and receive the strain and stresses of the chains in action. These transverse rocker-like rounded shoes 16, are designed to firmly and properly seat on the inner surface of the wheel rim or felloe, without regard to the length to which the outer-side bar is adjusted. The inner side bar is composed of two longitudinal overlapping sections fitted together and longitudinally slidable with respect to each other (when the bolts are removed) to extend or contract the effective length of the bar. Each section is composed of an end head 17 of full thickness and width and formed with a longitudinal slot for an end clamping bolt, and a longitudinal body or shank of reduced thickness. The body 18 of one section is flat and of slightly reduced width while the complementary body or shank 19 of the other section has lateral top and bottom longitudinal flanges 19$^a$ lapping the longitudinal edges of body 18 of the other section, whereby the two sections are held in alinement.

The shank or body of each section is formed with a longitudinal slot for the passage of the central or intermediate clamping bolt. Each slot is preferably formed by a longitudinal series of bolt holes 20 arranged so closely together as to merge or open into each other. However, I do not wish to so limit my invention. The bolt holes in the outermost section of the bar are preferably angular to receive the angular portion of the bolt shank and thereby hold the bolt against rotation.

It will be noted, that when the sections of the bar are adjusted to the desired positions to provide a bar of the desired length, the intermediate bolt is inserted through the sections and will lock them against relative longitudinal movement and the bolt head will camp the sections together against the spokes.

The outside bar is similarly formed by complementary longitudinal overlapping sections 21, 22, one of which has the longitudinal edge flanges 21$^a$. These sections are adjusted as described in connection with the inner side bar, and each section has an end head providing a slot 23 for an end clamping bolt and a reduced extension 10 provided with the chain attaching finger 8, extending from its inner face or edge and the rim engaging pillow from the outer face or edge.

The sections of the outer side bar are locked together by the bolts and by the nuts on the bolts that tighten the bar against the spokes.

The sections of these extensible clamping bars are locked together against relative longitudinal movement by the insertion of the bolts without regard to the presence or absence of nuts on the bolts.

It will be noted that the bolt anchoring bar (inner side bar) of Figs. 5 and 7, is formed with a depressed bolt head receiving seat, for the purpose of more or less deeply insetting the bolt heads. This is accomplished by employing a bar with a relatively thin body or central portion and a surrounding edge bead or flange 1$^c$ to give the bar the necessary strength.

It is evident that various changes, modifications and variations might be resorted to without departing from the spirit and scope of my invention as defined by the following claims and hence I do not wish to limit myself to the exact disclosure thereof.

What I claim is:—

1. An anti-skid device for vehicle wheels, comprising an elongated bar having end shoes to abut against the inner surface of the wheel felly and also having free end fingers projecting inwardly from the inner edges of the end portions of the bar, means for clamping said bar against a lateral surface of a vehicle wheel, and a flexible traction element constructed to extend across the tread of the vehicle tire and across the inner surface of the wheel felly and having opposite end links formed to both slip over either of said fingers and detachably confine the traction element to the wheel through the medium of said one finger.

2. An anti-skid device comprising a bolt anchorage bar, a chain attaching bar having longitudinally extended ends forming shoes to bear against the wheel felly, each end provided with an inwardly projecting finger, a pair of traction elements, each adapted to extend around the wheel tire and across the felly and at its opposite ends having links both adapted to removably slip on one of said fingers and thereby attach the element through the medium of the one finger, and cross bolts for clamping the two bars together and to opposite side faces of a wheel.

3. Anti-skid device embodying a clamping bar, means to clamp the same against a lateral face of a vehicle wheel, and a flexible traction element at its opposite ends having links for removably attaching the chain to said bar, said bar having an inwardly projecting finger formed to enter both the said links, said finger formed with opposite edge link-receiving sockets.

4. An anti-skid device embodying a bar elongated to traverse several spokes of a wheel, means for clamping the bar against the lateral face of a vehicle wheel, said bar having fingers, and a pair of traction chains each formed to extend across the wheel tire and felly and at both ends having closed links formed to slip one over the other onto either of said fingers over the free end thereof.

5. An anti-skid device embodying a bar, means for clamping the bar against a lateral face of a vehicle wheel, said bar formed with a finger, and a traction chain formed to extend across the wheel tire and felly and at both ends having closed links formed to slip one over the other onto said finger over the free end thereof, said finger having opposite edge sockets at different elevations to receive ends of the links, respectively.

6. An anti-skid device embodying a bar, means for clamping the bar against a lateral face of a vehicle wheel, said bar formed with a finger, and a traction chain formed to extend across the wheel tire and between wheel spokes and at both ends having closed links formed to slip one over the other onto said finger over the free end thereof, said finger being elongated and approximately straight and projecting inwardly from the inner edge of the bar, the outer side of the portion of the bar that is formed with said finger having a wheel felly abutting shoe.

7. An anti-skid device embodying a bar having end wheel-felly-abutting shoes, means for clamping the bar against a lateral face of a vehicle wheel, said bar formed at each end with a finger, and a traction chain formed to extend across the wheel tire and rim and at both ends having closed links formed to slip one over the other onto either of said fingers over the free ends thereof, said fingers being perforated at the free end to receive removable stops.

8. An anti-skid device embodying a clamping bar, means to clamp the same against a lateral face of a vehicle wheel, said bar having a reduced portion formed at its outer edge to bear against the wheel felly and having a finger projecting inwardly from its inner edge, and a removable flexible traction element adapted to extend across the wheel tire and inner surface of the felly, the opposite ends of said element having links arranged to removably slip onto said finger over the free end thereof and rest one on the other at the inner edge of the bar, and thereby attach both ends of the element to the bar through the medium of said one finger.

9. An anti-skid device embodying a bar at the outer edges of its ends formed with shoes to seat against the inner surface of a vehicle felly, said ends formed with means for attaching traction elements thereto, and traction elements, each having devices at both ends formed for coupling to said bar by said means at either end of the bar.

10. An anti-skid device embodying a clamping bar having longitudinally extended reduced ends forming shoes to seat on the felly and at their inner edges having chain attaching fingers, means to clamp the bar to a lateral face of a wheel, and anti-skid chains, each at both ends having means to slip onto one of said fingers.

11. An anti-skid device embodying a clamping bar at its outer edge having rounded transverse shoes to bear on the inner surface of the wheel felly and means at the inner edges of the bar opposite said shoes for the attachment of the ends of anti-skid chains, and means for clamping said bar to a lateral face of a wheel.

12. An anti-skid device comprising an anti-skid chain attaching bar formed to fit a side face of a wheel, means for clamping said bar against a side face of a wheel, and a traction chain at both ends having similar open links and constructed and arranged to extend across the wheel tire with both of its ends arranged one over the other across the inner edge of said bar and located inwardly therefrom, said bar having means for coupling both of said chain ends thereto at said inner edge.

13. An anti-skid device comprising an anti-skid chain attaching bar formed to fit a side face of a wheel, means for clamping said bar against a side face of a wheel, and a traction chain having open links at both ends and constructed and arranged to extend across the wheel tire with both of its ends arranged at the inner edge of said bar and transversely thereof, said bar having a notched finger for coupling both of said chain ends thereto at said inner edge.

14. An anti-skid device comprising a bar elongated to traverse several wheel spokes and formed with means for detachably coupling the oppositely extending meeting ends of an anti-skid chain thereto, means for clamping said bar against a side face of a wheel, and an anti-skid chain of sufficient length to extend across the wheel tire with its oppositely extending ends having open links arranged one over the other transversely across the inner edge of said bar and overlapping and adapted to be both coupled thereto through the medium of said first mentioned means.

15. An anti-skid device comprising an elongated bar having projecting ends each arranged to permit the oppositely-extending ends of an anti-skid chain to meet across its inner surface, each end formed to provide means whereby both ends of an anti-skid chain can be coupled thereto, bolts for clamping said bar against the side face of a wheel, and a pair of anti-skid chains, each chain at both ends constructed and arranged to meet across said bar and be coupled thereto by said means at either end of the bar, each chain at both ends having open links to drop onto said means.

16. An anti-skid device comprising an elongated bar having anti-skid chain coupling means, means for clamping the bar against a side face of a wheel, said bar composed of longitudinally overlapping sections whereby the bar can be adjusted to vary its effective length, means being provided to normally maintain said bar in the desired adjustment, the outer edges of the end portions of said bar having raised wheel felly engaging pillows formed to bear against the wheel felly when the bar is adjusted to any operative length.

JOHN REICHERT.